(12) United States Patent
Yester

(10) Patent No.: US 8,818,641 B2
(45) Date of Patent: Aug. 26, 2014

(54) METHOD OF INTERSECTION ESTIMATION FOR A VEHICLE SAFETY SYSTEM

(75) Inventor: John L. Yester, Birmingham, MI (US)

(73) Assignee: Honda Motor Co., Ltd., Tokyo (JP)

( * ) Notice: Subject to any disclaimer, the term of this patent is extended or adjusted under 35 U.S.C. 154(b) by 816 days.

(21) Appl. No.: 12/962,105

(22) Filed: Dec. 7, 2010

(65) Prior Publication Data

US 2011/0153166 A1    Jun. 23, 2011

Related U.S. Application Data

(60) Provisional application No. 61/287,944, filed on Dec. 18, 2009.

(51) Int. Cl.
*B60R 22/00* (2006.01)

(52) U.S. Cl.
USPC .......................................................... 701/45

(58) Field of Classification Search
None
See application file for complete search history.

(56) References Cited

U.S. PATENT DOCUMENTS

| | | | |
|---|---|---|---|
| 3,689,882 A * | 9/1972 | Dessailly | ..................... 340/903 |
| 5,289,181 A | 2/1994 | Watanabe et al. | |
| 5,485,161 A | 1/1996 | Vaughn | |
| 5,539,398 A | 7/1996 | Hall et al. | |
| 5,939,976 A | 8/1999 | Sasaki et al. | |
| 5,940,010 A | 8/1999 | Sasaki et al. | |
| 5,999,878 A | 12/1999 | Hanson et al. | |
| 6,047,234 A | 4/2000 | Cherveny et al. | |
| 6,163,750 A | 12/2000 | Nojima | |
| 6,169,495 B1 | 1/2001 | Koike | |
| 6,307,484 B1 | 10/2001 | Sasaki et al. | |
| 6,356,840 B2 | 3/2002 | Kusama | |
| 6,370,475 B1 | 4/2002 | Breed et al. | |
| 6,385,539 B1 | 5/2002 | Wilson et al. | |
| 6,405,128 B1 | 6/2002 | Bechtolsheim et al. | |
| 6,405,132 B1 | 6/2002 | Breed et al. | |
| 6,516,267 B1 | 2/2003 | Cherveny et al. | |
| 6,516,273 B1 | 2/2003 | Pierowicz et al. | |
| 6,526,348 B1 | 2/2003 | McDonough | |
| 6,526,352 B1 | 2/2003 | Breed et al. | |

(Continued)

FOREIGN PATENT DOCUMENTS

| | | |
|---|---|---|
| JP | 2005006081 | 1/2005 |
| JP | 2005165643 | 6/2005 |

(Continued)

OTHER PUBLICATIONS

The International Search Report and the Written Opinion of the International Searching Authority, or The Declaration mailed in PCT Application No. PCT/US2010/051761.

(Continued)

*Primary Examiner* — Thomas Tarcza
*Assistant Examiner* — Adam Alharbi
(74) *Attorney, Agent, or Firm* — Plumsea Law Group, LLC

(57) ABSTRACT

A method of estimating an intersection location for a vehicle safety system is disclosed. The method includes steps of calculating a stopping distance according to operating parameters of the motor vehicle. The method also includes a step of determining a location for an intersection using the stopping distance and the location of the vehicle. The method further includes steps of determining a distance between a remote vehicle and the intersection. A vehicle safety system is controlled according to the distance between the motor vehicle and the intersection and the distance between the remote vehicle and the intersection.

6 Claims, 8 Drawing Sheets

(56) References Cited

U.S. PATENT DOCUMENTS

| | | | |
|---|---|---|---|
| 6,624,782 B2 | 9/2003 | Jocoy et al. | |
| 6,640,188 B2 | 10/2003 | Hashida | |
| 6,658,356 B2 | 12/2003 | Chen et al. | |
| 6,720,920 B2 | 4/2004 | Breed et al. | |
| 6,735,515 B2 | 5/2004 | Bechtolsheim et al. | |
| 6,763,301 B2 | 7/2004 | McDonough | |
| 6,768,944 B2 | 7/2004 | Breed et al. | |
| 6,810,327 B2 | 10/2004 | Akashi | |
| 6,816,779 B2 | 11/2004 | Chen et al. | |
| 6,836,781 B2 | 12/2004 | McDonough | |
| 6,853,913 B2 | 2/2005 | Cherveny et al. | |
| 6,859,731 B2 | 2/2005 | Takafuji et al. | |
| 6,865,479 B2 | 3/2005 | Chen et al. | |
| 6,868,410 B2 | 3/2005 | Fortin et al. | |
| 7,046,827 B2 | 5/2006 | Chen et al. | |
| 7,072,764 B2 | 7/2006 | Donath et al. | |
| 7,079,946 B2 | 7/2006 | Hunzinger | |
| 7,085,637 B2 | 8/2006 | Breed et al. | |
| 7,102,496 B1 | 9/2006 | Ernst, Jr. et al. | |
| 7,110,880 B2 | 9/2006 | Breed et al. | |
| 7,124,025 B2 | 10/2006 | Okada et al. | |
| 7,124,027 B1 | 10/2006 | Ernst, Jr. et al. | |
| 7,133,768 B2* | 11/2006 | Mukaiyama | 701/400 |
| 7,133,775 B2 | 11/2006 | Adamski et al. | |
| 7,151,467 B2 | 12/2006 | Fujita et al. | |
| 7,194,347 B2 | 3/2007 | Harumoto et al. | |
| 7,202,776 B2 | 4/2007 | Breed | |
| 7,209,051 B2 | 4/2007 | Shankwitz et al. | |
| 7,295,925 B2 | 11/2007 | Breed et al. | |
| 7,317,406 B2 | 1/2008 | Wolterman | |
| 7,406,381 B2 | 7/2008 | Obata | |
| 7,418,346 B2 | 8/2008 | Breed et al. | |
| 7,426,437 B2 | 9/2008 | Breed et al. | |
| 7,433,889 B1 | 10/2008 | Barton | |
| 7,440,830 B2 | 10/2008 | Isaji et al. | |
| 7,440,850 B2 | 10/2008 | Kim | |
| 7,486,202 B2 | 2/2009 | Konishi et al. | |
| 7,519,472 B1 | 4/2009 | Grigsby et al. | |
| 7,720,026 B2 | 5/2010 | Chen et al. | |
| 2003/0016143 A1 | 1/2003 | Ghazarian | |
| 2003/0134645 A1 | 7/2003 | Stern et al. | |
| 2004/0158390 A1* | 8/2004 | Mukaiyama | 701/200 |
| 2004/0236543 A1 | 11/2004 | Stephens | |
| 2005/0033505 A1 | 2/2005 | Zatz | |
| 2005/0143889 A1 | 6/2005 | Isaji et al. | |
| 2005/0272560 A1* | 12/2005 | Doering et al. | 477/186 |
| 2006/0173611 A1 | 8/2006 | Takagi et al. | |
| 2007/0005609 A1 | 1/2007 | Breed | |
| 2007/0013497 A1 | 1/2007 | Watanabe | |
| 2007/0021915 A1 | 1/2007 | Breed et al. | |
| 2007/0027583 A1 | 2/2007 | Tamir et al. | |
| 2007/0073463 A1 | 3/2007 | Sherony et al. | |
| 2007/0124067 A1 | 5/2007 | Kim et al. | |
| 2007/0171095 A1 | 7/2007 | Mochizuki | |
| 2007/0208493 A1 | 9/2007 | Downs et al. | |
| 2007/0208494 A1 | 9/2007 | Chapman et al. | |
| 2007/0208495 A1 | 9/2007 | Chapman et al. | |
| 2007/0208496 A1 | 9/2007 | Downs et al. | |
| 2007/0208501 A1 | 9/2007 | Downs et al. | |
| 2007/0276600 A1 | 11/2007 | King et al. | |
| 2007/0280503 A1 | 12/2007 | Kubota et al. | |
| 2007/0282532 A1 | 12/2007 | Yamamoto et al. | |
| 2008/0015771 A1 | 1/2008 | Breed et al. | |
| 2008/0015772 A1 | 1/2008 | Sanma et al. | |
| 2008/0021641 A1 | 1/2008 | Kim | |
| 2008/0024323 A1 | 1/2008 | Kadaba | |
| 2008/0040023 A1 | 2/2008 | Breed et al. | |
| 2008/0040029 A1 | 2/2008 | Breed | |
| 2008/0040032 A1 | 2/2008 | Ohashi | |
| 2008/0042815 A1 | 2/2008 | Breed et al. | |
| 2008/0046165 A1 | 2/2008 | Downs et al. | |
| 2008/0071465 A1 | 3/2008 | Chapman et al. | |
| 2008/0106436 A1 | 5/2008 | Breed | |
| 2008/0120025 A1 | 5/2008 | Naitou et al. | |
| 2008/0128190 A1 | 6/2008 | Tsutsumi et al. | |
| 2008/0133136 A1 | 6/2008 | Breed et al. | |
| 2008/0140318 A1 | 6/2008 | Breed | |
| 2008/0147253 A1 | 6/2008 | Breed | |
| 2008/0150786 A1 | 6/2008 | Breed | |
| 2008/0154495 A1 | 6/2008 | Breed | |
| 2008/0154629 A1 | 6/2008 | Breed et al. | |
| 2008/0161986 A1 | 7/2008 | Breed | |
| 2008/0161987 A1 | 7/2008 | Breed | |
| 2008/0162036 A1 | 7/2008 | Breed | |
| 2008/0165018 A1 | 7/2008 | Breed | |
| 2008/0167819 A1 | 7/2008 | Breed | |
| 2008/0167821 A1 | 7/2008 | Breed | |
| 2008/0215202 A1 | 9/2008 | Breed | |
| 2008/0215231 A1 | 9/2008 | Breed | |
| 2008/0243378 A1 | 10/2008 | Zavoli | |
| 2009/0030605 A1 | 1/2009 | Breed | |
| 2009/0033540 A1 | 2/2009 | Breed et al. | |
| 2009/0043497 A1 | 2/2009 | Tashev et al. | |
| 2009/0043506 A1 | 2/2009 | Breed | |
| 2009/0048750 A1 | 2/2009 | Breed | |
| 2009/0070031 A1 | 3/2009 | Ginsberg | |
| 2009/0082917 A1 | 3/2009 | Adachi | |
| 2009/0224942 A1 | 9/2009 | Goudy et al. | |
| 2009/0299857 A1* | 12/2009 | Brubaker | 705/14.66 |
| 2010/0106413 A1 | 4/2010 | Mudalige | |
| 2011/0029195 A1* | 2/2011 | Yamada et al. | 701/36 |
| 2013/0179057 A1* | 7/2013 | Fisher et al. | 701/117 |

FOREIGN PATENT DOCUMENTS

| | | |
|---|---|---|
| JP | 2005182310 | 7/2005 |
| JP | 2005242943 | 9/2005 |
| JP | 2006011607 | 1/2006 |
| JP | 2007141114 | 6/2007 |
| JP | 2007200052 | 8/2007 |
| JP | 2007279004 | 10/2007 |
| JP | 2007328573 | 12/2007 |
| JP | 2008009870 | 1/2008 |
| JP | 2008062787 | 3/2008 |
| JP | 2008101458 | 5/2008 |
| JP | 2008132894 | 6/2008 |
| JP | 2008198162 | 8/2008 |
| JP | 2008276688 | 11/2008 |
| JP | 2009031837 | 2/2009 |

OTHER PUBLICATIONS

International Search Report and Written Opinion mailed Apr. 20, 2012 in International Application No. PCT/US2012/021844.
International Preliminary Report on Patentability (including Written Opinion of the ISA) mailed Apr. 19, 2012 in International Application No. PCT/US2010/051761.
International Preliminary Report on Patentability (including Written Opinion of the ISA) mailed May 10, 2013 in International Application No. PCT/US2010/060695.
International Search Report and Written Opinion mailed Dec. 12, 2011 in International Application No. PCT/US2010/60695.
International Preliminary Report on Patentability (including Written Opinion of the ISA) mailed Aug. 1, 2013 in International Application No. PCT/US2012/021844.
Japanese Office Action dated Aug. 6, 2013 in Japanese Patent Application No. 2012-544815.

* cited by examiner

METHOD OF INTERSECTION ESTIMATION FOR A VEHICLE SAFETY SYSTEM

RELATED APPLICATION INFORMATION

This application claims the benefit pursuant to 35 U.S.C. §119(e) of U.S. Provisional Patent Application Ser. No. 61/287,944, entitled "Method of Intersection Estimation for a Vehicle Safety System," which was filed with the U.S. Patent and Trademark Office on Dec. 18, 2009, which application is hereby incorporated by reference in its entirety into this disclosure.

BACKGROUND

The present invention relates generally to a motor vehicle, and in particular to a method for estimating the location of an intersection for a vehicle safety system.

Vehicle safety systems may be used to provide information to a driver. Vehicle safety systems can also be used to actively control systems or components of a motor vehicle during, or prior to, collisions. An example of a vehicle safety system is a collision warning system that provides information regarding a potential hazard or collision to a driver. Current systems use navigation information to determine intersection locations for controlling vehicle safety systems. Potential threats to a driver upon approaching the intersections are determined by the vehicle safety system.

The related art relies on mapping information to determine the locations of intersections where potential collisions could occur. There exists a need in the art for a method that addresses the shortcomings of the related art.

SUMMARY

The invention discloses a method of identifying an intersection. The invention can be used in connection with a motor vehicle. The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of operating a motor vehicle, comprising the steps of: receiving a vehicle speed, a vehicle location and a braking information; determining if a driver intends to turn; determining if a driver is braking; calculating a stopping distance according to the vehicle speed and the braking information when the driver intends to turn and when the driver is braking; determining a location for an intersection according to the vehicle location and the stopping distance; and controlling a vehicle safety system according to the location for the intersection.

In one aspect, the invention provides a method of operating a motor vehicle, comprising the steps of: receiving a vehicle speed, a vehicle location and braking information; estimating a first distance between the motor vehicle and an intersection using the vehicle speed and the braking information; determining a second distance between the motor vehicle and a remote vehicle; estimating a third distance between the remote vehicle and the intersection using the first distance and the second distance; and controlling a vehicle safety system of the motor vehicle according to the first distance and the third distance.

In one aspect, the invention provides a method of operating a motor vehicle, comprising the steps of: receiving a vehicle speed, a vehicle location and braking information; determining if a driver intends to turn; determining if a driver is braking; retrieving a driver-intersection profile, the driver-intersection profile including historical intersection driving data associated with the driver; using the driver-intersection profile, the vehicle speed and the braking information to calculate a stopping distance when the driver intends to turn and when the driver braking; determining a location for an intersection according to the vehicle location and the stopping distance; and controlling a vehicle safety system according to the location for the intersection.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
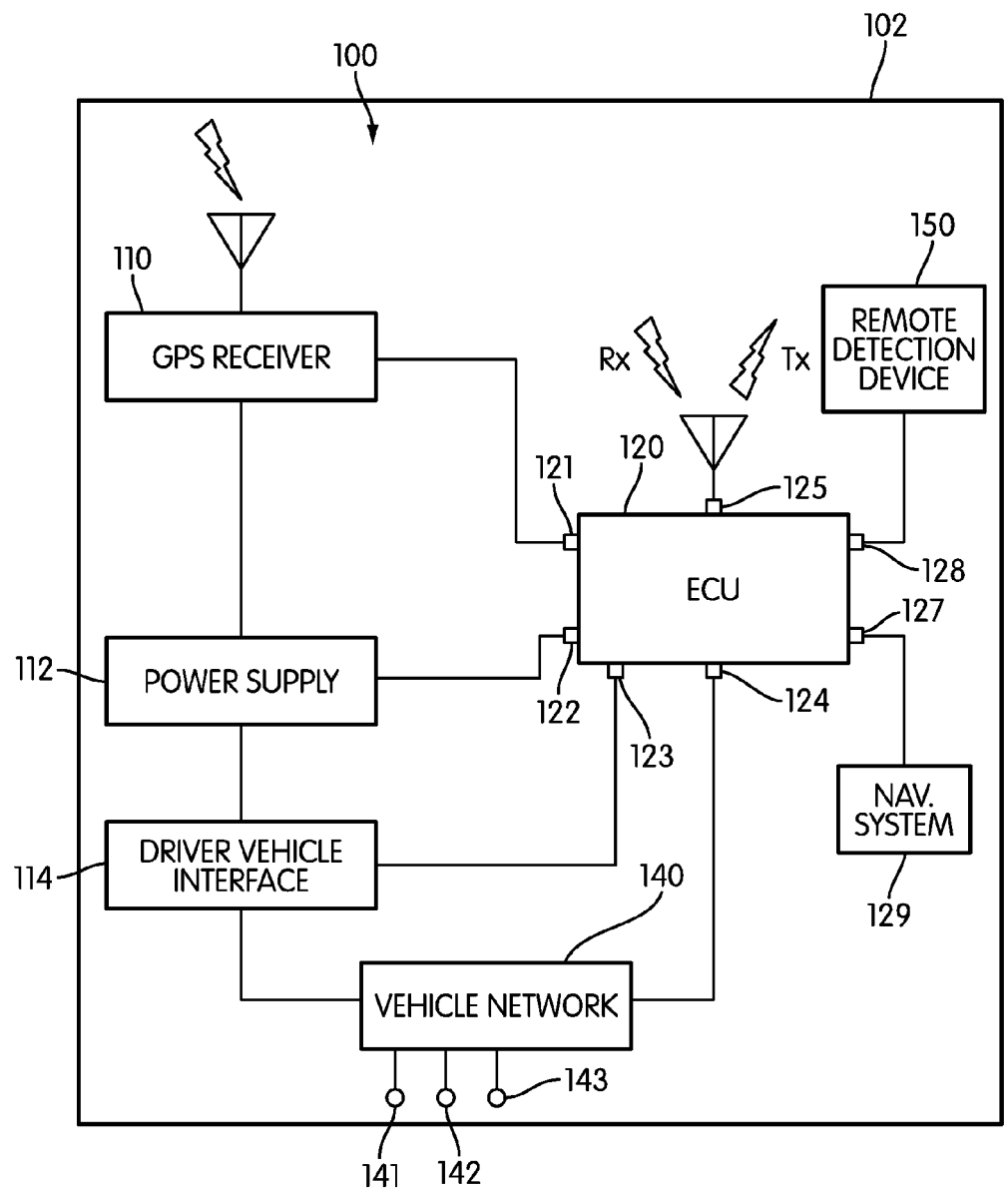
FIG. 1 is a schematic view of an embodiment of a motor vehicle including a vehicle safety system.

FIG. 1 is a schematic view of an embodiment of vehicle safety system 100 that is configured to be used within motor vehicle 102. The term "vehicle safety system" as used throughout this detailed description and in the claims refers to any system of a motor vehicle that is configured to facilitate safe driving. The term "vehicle safety system" is intended to include both active vehicle safety systems and passive vehicle safety systems. As an example, a collision warning system can be used to help detect and inform a driver about potential collisions with surrounding vehicles or other objects. For purposes of clarity, only some components of a motor vehicle that may be relevant to vehicle safety system 100 are illustrated. Furthermore, in other embodiments, additional components can be added or removed.

Vehicle safety system 100 can include provisions for receiving navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite System (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

Vehicle safety system 100 can include provisions for receiving GPS information. In some cases, vehicle safety system 100 can include GPS receiver 110. In an exemplary embodiment, GPS receiver 110 can be used for gathering GPS information for any systems of a motor vehicle, including, but not limited to: GPS based navigation systems.

In some embodiments, vehicle safety system 100 can be associated with a navigation system. In one embodiment, vehicle safety system 100 can be associated with navigation system 129. Generally, navigation system 129 can be any type of navigation system known in the art that is capable of using GPS based information to indicate a location for a vehicle and/or to plot routes for a driver. In some cases, a navigation system may be associated with mapping information that provides any of the GPS type information discussed above. In an exemplary embodiment, a navigation system can include roadway information as well as intersection information related to the intersections of two or more roadways.

Vehicle safety system 100 can include provisions for powering one or more devices. In some cases, vehicle safety system 100 can include power supply 112. Generally, power supply 112 can be any type of power supply associated with a motor vehicle. In some cases, power supply 112 can be a car battery. In other cases, power supply 112 can be another type of power supply available within motor vehicle 102. Although power supply 112 is shown as connected to some components of motor vehicle 102 in the current embodiment, it will be understood that in other embodiment additional components can be connected to power supply 112. In still other cases, some components that are shown as connected to power supply 112 may not be connected to power supply 112.

Vehicle safety system 100 can include provisions for communicating with a driver. In some embodiments, vehicle safety system 100 can include driver vehicle interface 114. In some cases, driver vehicle interface 114 can include provisions for transmitting information to a driver and/or passenger. In other cases, driver vehicle interface 114 can include provisions for receiving information from a driver and/or passenger. In an exemplary embodiment, driver vehicle interface 114 can include provisions for transmitting and receiving information from a driver and/or passenger. It will be further understood that in some embodiments, a driver vehicle interface can be associated directly with a navigation system of a motor vehicle. In other words, in some embodiment, a driver vehicle interface can be combined, or integrated into, a navigation system. With this arrangement, information communicated between a driver and a vehicle safety system can be accomplished using an interface of a navigation system.

Vehicle safety system 100 can include provisions for determining the determining properties such as the range and/or speed of another vehicle or object. In some embodiments, vehicle safety system 100 can include a remote detection device. Examples of remote detection devices include, but are not limited to: devices employing RADAR technology, devices employing LIDAR technology, as well as other types of remote sensing devices that are known in the art. In the exemplary embodiment, vehicle safety system 100 can be associated with remote detection device 150 that is disposed within motor vehicle 102.

Motor vehicle 102 may include provisions for communicating, and in some cases controlling, the various components associated with vehicle safety system 100. In some embodiments, vehicle safety system 100 may be associated with a computer or similar device. In the current embodiment, vehicle safety system may include electronic control unit 120, hereby referred to as ECU 120. In one embodiment, ECU 120 may be configured to communicate with, and/or control, various components of vehicle safety system 100. In addition, in some embodiments, ECU 120 may be configured to control additional components of a motor vehicle that are not shown.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 120 can include port 121 for communicating with GPS receiver 110. In particular, ECU 120 may be configured to receive GPS information from GPS receiver 110. In addition, ECU 120 can include port 122 for receiving power from power supply 112. Also, ECU 120 can include port 123 for communicating with driver vehicle interface 114. In particular, ECU 120 can be configured to transmit information to driver vehicle interface 114, as well as to receive information from driver vehicle interface 114. Furthermore, in embodiments employing a remote detection device, ECU 120 can also include port 128 for communication with remote detection device 150. In embodiments where a driver vehicle interface for vehicle safety system 100 and navigation system 129 are distinct units, ECU 120 can also include port 127 for communicating with navigation system 129.

A vehicle safety system can include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In some embodiments, ECU 120 may include port 125 that is configured to communicate with one or more DSRC devices. In an exemplary embodiment, port 125 may be associated with a DSRC antenna that is configured to transmit and/or receive vehicle information over one or more vehicle communication networks.

Vehicle safety system 100 can include provisions for communicating with one or more components of a motor vehicle that are not associated directly, or indirectly with vehicle safety system 100. In some cases, ECU 120 may include additional ports for communicating directly with one or more additional devices of a motor vehicle, including various sensors or systems of the motor vehicle. In an exemplary embodiment, ECU 120 may include port 124 for communicating with vehicle network 140. By providing communication between ECU 120 and vehicle network 140, ECU 120 may have access to additional information concerning motor vehicle 102. For instance, in some cases, ECU 120 may be configured to receive information related to various operating conditions of a motor vehicle. Examples of information that may be received via vehicle network 140 include, but are not limited to: vehicle speed, engine speed, braking conditions, turning status, steering wheel angle, as well as other parameters associated with the operating condition of motor vehicle 102.

In some embodiments, information from various sensors and/or devices of motor vehicle 102 may be provided to ECU 120 through vehicle network 140. For example, in one embodiment, information from vehicle speed sensor 141, brake sensor 142 and turning status indicator 143 can be communicated to ECU 120 through vehicle network 140. In other cases, information from vehicle speed sensor 141, brake sensor 142 and turning indicator 143 can be communicated directly to ECU using wired or wireless connections, without being routed through vehicle network 140.

A vehicle safety system can include provisions for controlling one or more systems in a motor vehicle that may be utilized during a collision, or that can be used to help avoid a collision. For example, in some embodiments, ECU 120 may be configured to communicate with a brake actuator to help control braking prior to, or during a collision. In other embodiments, ECU 120 may be configured to communicate with an electric seat belt pre-tensioner to help control a seat belt during a collision. In still other embodiments, any systems of a motor vehicle can be controlled using ECU 120. In some embodiments, ECU 120 can be configured with additional ports for communicating with other systems of a motor vehicle, including systems used during a collision. In other embodiments, ECU 120 can be configured to communicate with these systems using a vehicle network. With this arrangement, a vehicle safety system can be configured to control one or more systems that may be used to help avoid a collision or to increase the safety of one or more occupants during a collision.

Figure 2:
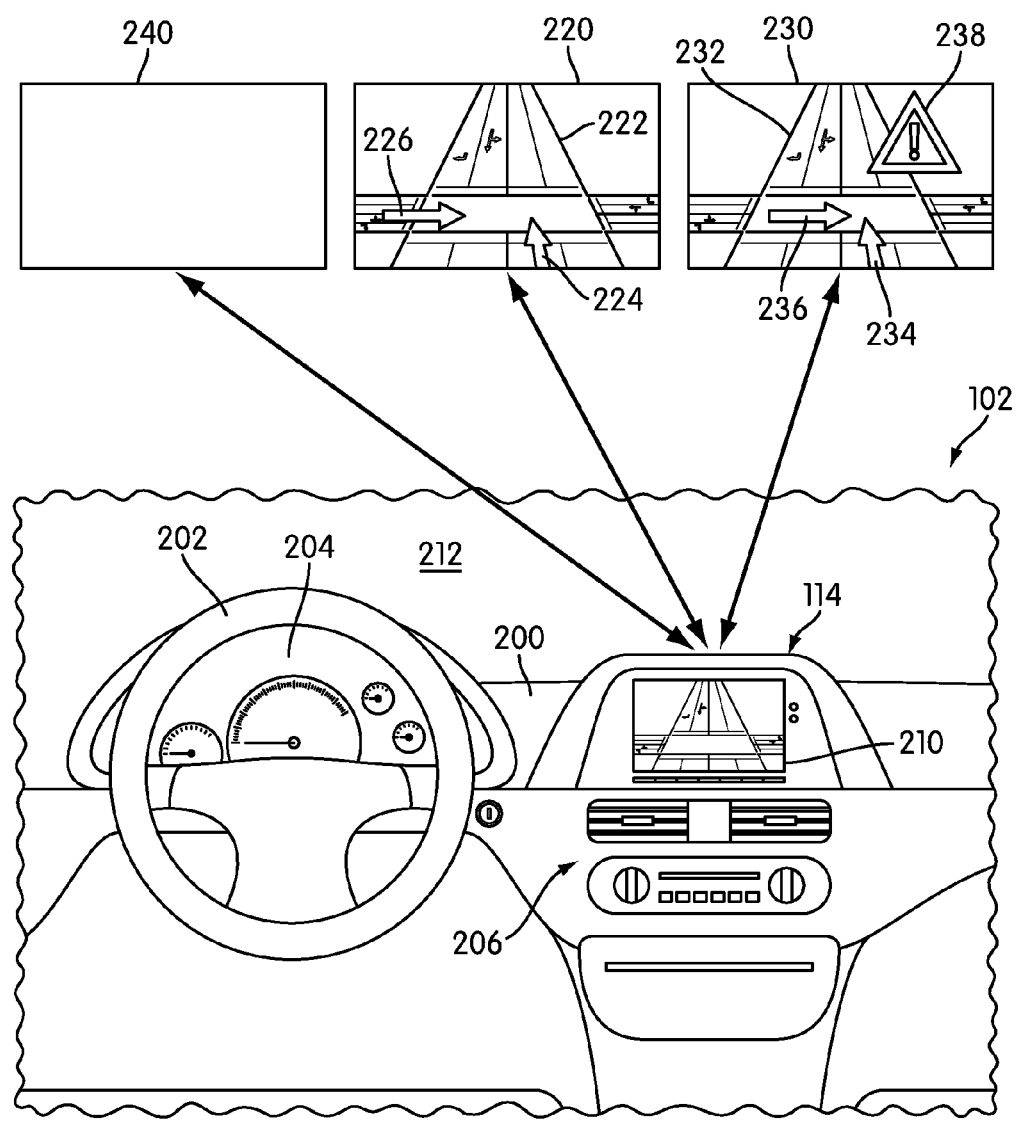
FIG. 2 is a schematic view of an embodiment of an interior of a motor vehicle including a vehicle safety system.

FIG. 2 illustrates an embodiment of dashboard 200 for motor vehicle 102. Dashboard 200 may include steering wheel 202 and instrument panel 204. In some embodiments, dashboard 200 can further include center portion 206. In some cases, center portion 206 can include one or more devices associated with an interior of a motor vehicle. Examples include, but are not limited to: audio devices, video devices, navigation devices, as well as any other types of devices. In addition, center portion 206 can be associated with controls for one or more systems of motor vehicle 102 including, but not limited to: climate control systems and other types of systems.

A motor vehicle can include provisions for displaying information from a vehicle safety system. As previously discussed, a vehicle safety system can be any system configured to facilitate safer driving for a motor vehicle. The current embodiment illustrates a vehicle safety system in the form of a collision warning system. However, it will be understood that in other embodiments the methods discussed below could be applied to any type of vehicle safety system and is not restricted to use with a collision warning system.

In some embodiments, a motor vehicle can include a display device of some kind. In some cases, a motor vehicle can include a video screen for displaying information from a collision warning system. Examples of display devices include, but are not limited to: LCDs, CRTs, ELDs, LEDs, OLEDs, as well as other types of displays. In other cases, a display device could be a projection type display device that is configured to project an image onto one or more surfaces of motor vehicle 102. It will be understood that a display device may not be limited to a video screen or projection type display device.

In one embodiment, motor vehicle 102 can include display device 210. In some cases, display device 210 may be associated with driver vehicle interface 114 of vehicle safety system 100. In particular, display device 210 may be configured to present visual information received from vehicle safety system 100. In an exemplary embodiment, display device 210 may be an LCD screen.

In some embodiments, display device 210 can be disposed within center portion 206. However, it will be understood that in other embodiments, display device 210 can be located in any portion of motor vehicle 102 as long as display device 210 can be viewed by a driver. For example, in another embodiment, display device 210 may be a projection type device that displays an image onto front window 212. In addition, while display device 210 can be configured to present visual information received from vehicle safety system 100, display device 210 may be shared with other devices or systems within motor vehicle 100. For example, display device 210 could also be used as a screen for a navigation system.

It will be understood that in some embodiments, a driver vehicle interface can include additional provisions beyond a display screen. For example, in another embodiment, a driver vehicle interface can also be associated with one or more input devices that allow a driver to control various aspects of a collision warning system. In some cases, a driver vehicle interface can include an on/off button for turning a collision warning system on and off. In still another embodiment, a driver vehicle interface can be associated with speakers for generating auditory information.

A display device for a collision warning system can be configured to display one or more images associated with various types of alerts of the collision warning system. For purposes of clarity, the following detailed description discusses a collision warning system utilizing two distinct alert types: informing alerts and warning alerts. In particular, informing alerts are used to inform a driver of nearby vehicles or objects that could pose potential problems at a later time. In contrast, a warning alert may be issued to warn the driver of a serious threat of collision with a nearby vehicle or object. In other words, informing alerts inform a driver of low level collision threats, while warning alerts inform a driver of high level collision threats. In other embodiments, any other number of alert types can be used. In some cases, three or more alert types could be issued by a collision warning system.

In the exemplary embodiment, vehicle safety system 100 includes informing alert image 220 that is associated with an informational alert. Informing alert image 220 may comprise one or more symbols or icons. In this embodiment, informing alert image 220 includes intersection symbol 222, which indicates an upcoming intersection. In addition, informing alert image 220 includes first arrow 224 and second arrow 226, representing the general location and heading of motor vehicle 102 and an approaching vehicle for which there may some threat of collision. By displaying informing alert image 220, a driver is alerted to a potential collision threat with an approaching vehicle. This information may help a driver to be more aware as motor vehicle 102 approaches the upcoming intersection.

In the exemplary embodiment, vehicle safety system 100 also includes warning alert image 230 that is associated with a warning alert. Warning alert image 230 may comprise one or more symbols or icons. In a similar manner to informing alert image 220, warning alert image 230 may include intersection symbol 232, first arrow 234 and second arrow 236. These symbols indicate information about an upcoming intersection as well as the speeds and headings of motor vehicle 102 and an approaching vehicle. In addition, warning alert image 230 includes warning symbol 238. The appearance of warning symbol 238 alerts a driver to an immediate threat posed by an approaching vehicle. This information may help a driver to avoid a collision by taking immediate action.

In addition to the two types of alerts discussed above, a display device may be configured to display no image when no alert has been issued by vehicle safety system 100. In this embodiment, display device 210 displays default screen 240 when no alert is issued. In the exemplary embodiment, default screen 240 is associated with a blank screen of display device 210. However, in embodiments where display device 210 is used for displaying information from other systems, default screen 240 may not be a blank screen. For example, in embodiments where display device 210 is shared between a navigational system and vehicle safety system 100, display device 210 may continue to display images received from the navigation system until an alert is issued. Likewise, once an alert has expired, display device 240 may return to displaying images from a navigation system.

Although a single image is shown for each type of alert (informing alerts and warning alerts) in the current embodiment, other embodiments can include more than one image for each type of alert. In particular, an arrow used to indicate position and heading of a vehicle can be changed from a straight arrow indicating the intention of a vehicle to pass straight through an intersection to curved arrows in cases where the intention of the vehicle is to turn at the intersection. This arrangement can help to inform a driver as to the intentions of an approaching vehicle. In addition, a three way intersection symbol can be used in place of a four way intersection symbol in cases where the upcoming intersection is a three way intersection. However, in embodiments using multiple images for each type of alert, it will be understood that some distinguishing elements may be used to indicate that an alert is an informing alert or a warning alert. For example, as in the current embodiment, a warning symbol can be used to distinguish between informing alerts and warning alerts. Likewise, in some cases, informing alerts can be associated with a different color than warning alerts. In one embodiment, informing alerts can include symbols or icons colored in yellow, while warning alerts can include symbols or icons colored in red.

Figure 3:
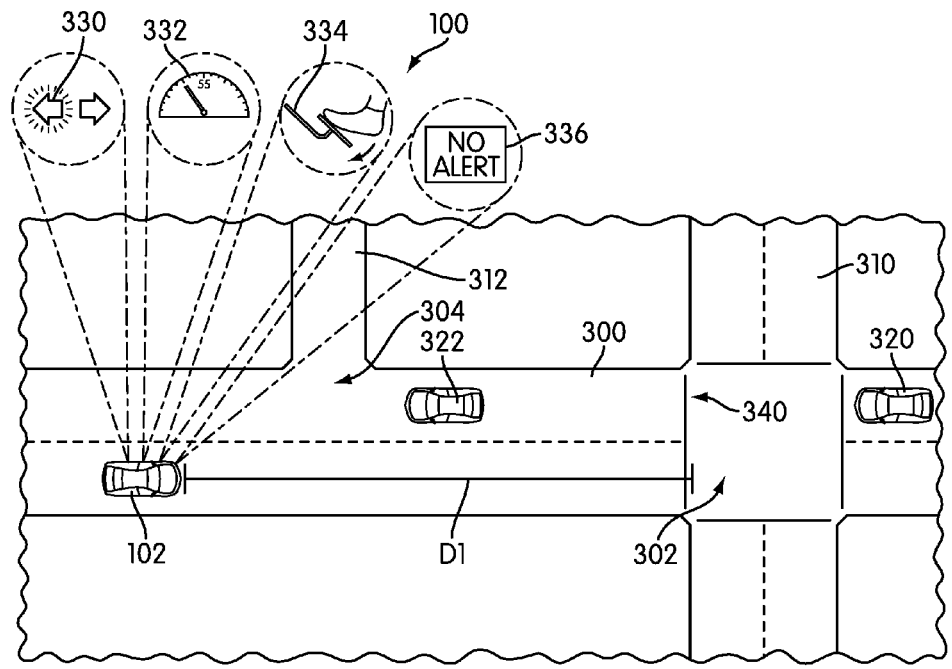
FIG. 3 is a schematic view of an embodiment of a motor vehicle traveling on a roadway.
Figure 4:
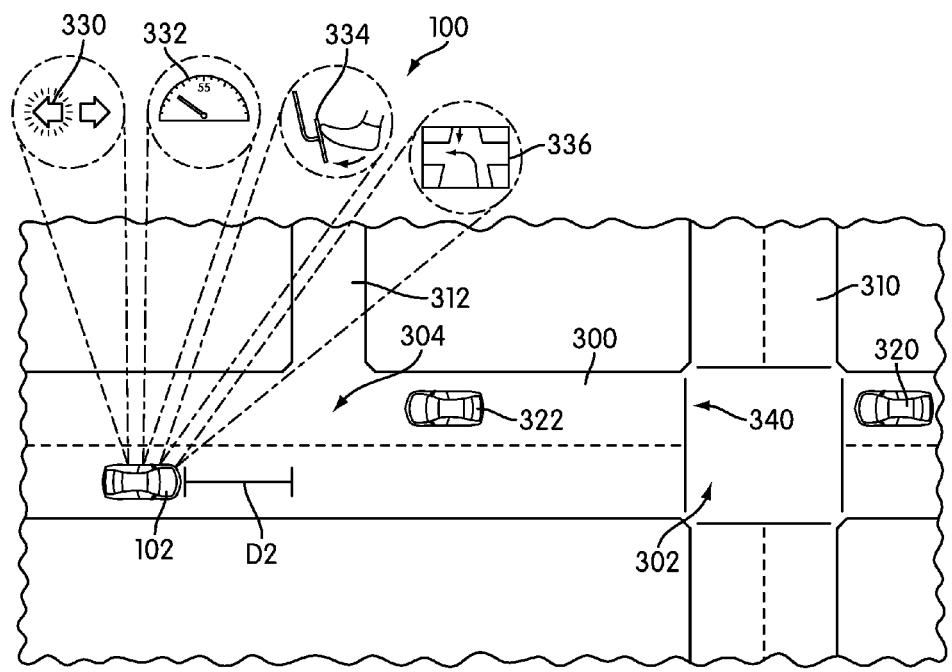
FIG. 4 is a schematic view of an embodiment of a motor vehicle traveling on a roadway.

FIGS. 3 and 4 illustrate embodiments of motor vehicle 102 traveling on roadway 300. Referring to FIGS. 3 and 4, roadway 300 includes first intersection 302 and second intersection 304. In this embodiment, first intersection 302 is a larger intersection associated with the intersection of roadway 300 and roadway 310, while second intersection 304 is a smaller intersection associated with driveway 312 that intersects roadway 300. In addition, first remote vehicle 320 and second remote vehicle 322 are also traveling on roadway 300 in an oncoming traffic lane of roadway 300. In particular, first remote vehicle 320 is about to enter first intersection 302. Likewise, second remote vehicle 322 is about to enter second intersection 304.

In embodiments where a vehicle safety system, such as a collision warning system, does not have information related to the locations of one or more nearby intersections, the vehicle safety system can include provisions for estimating the location of an intersection where a driver may intend to turn. In some embodiments, a vehicle safety system can include provisions for estimating the location of an intersection by estimating a location at which a turning vehicle intends to stop, since a driver may stop at an intersection just before making a left turn. In some embodiments, the vehicle safety system can estimate the location at which a driver intends to stop by monitoring various operating parameters of the vehicle. Examples of various parameters that could be monitored for purposes of determining a stopping location for a vehicle include, but are not limited to: vehicle speed, vehicle location, braking information, turning status information, engine speed information, acceleration information, transmission information as well as other types of information. In one embodiment, a vehicle safety system can be configured to estimate a stopping location using vehicle speed, braking information and a vehicle position.

Referring to FIG. 3, a driver in motor vehicle 102 intends to turn left at first intersection 302. In this case, the intention of the driver to turn left is indicated by turning status indicator 330. At this point, motor vehicle 102 may be traveling at approximately 40 mph, as indicated by speedometer 332. As motor vehicle 102 approaches first intersection 302, the driver may depress brake pedal 334 slightly to slow motor vehicle 102.

As the driver depresses brake pedal 334, vehicle safety system 100 may attempt to determine a location where motor vehicle 102 will stop. In this case, vehicle safety system 100 may determine a braking level from a brake sensor associated with brake pedal 334. Vehicle safety system 100 may then calculate stopping distance D1 using the vehicle speed and the braking level. Furthermore, using information about the current location of motor vehicle 102, obtained, for example, by GPS, vehicle safety system 100 can then determine an approximate location where motor vehicle 102 will stop. In this case, vehicle safety system 100 determines that motor vehicle 102 will stop at a location near first entrance 340 of first intersection 302. The stopping location of motor vehicle 102 is therefore estimated as the location of an intersection for purposes of controlling vehicle safety system 100.

In the current embodiment, vehicle safety system 100 determines an approximate location for an intersection that approximately corresponds with the location of first intersection 302. In other words, vehicle safety system 100 correctly identifies the location of first intersection 302, which is the intersection where the driver of motor vehicle 102 intends to turn left. At this point, vehicle safety system 100 may determine the locations of any nearby remote vehicles. In some cases, motor vehicle 102 may receive information from first remote vehicle 320 and second remote vehicle 322 through a vehicle communication network. In other cases, motor vehicle 102 may receive information about one or more remote vehicles using a remote detection device, such as a LIDAR.

Once vehicle safety system 100 detects the locations of first remote vehicle 320 and second remote vehicle 322, vehicle safety system 100 can calculate any potential threat posed by either first remote vehicle 320 or second remote vehicle 322. In this case, vehicle safety system 100 determines that there is no threat of collision between motor vehicle 102 and second remote vehicle 322, since second remote vehicle 322 is not passing through an intersection where motor vehicle 102 intends to turn. Also, while first remote vehicle 320 is passing through the intersection where motor vehicle 102 intends to turn, the vehicle safety system 100 may determine that there is no current threat of collision because motor vehicle 102 is too far away from first intersection 302. Therefore, at this point, vehicle safety system 100 does not issue any alert on display device 336. Of course, at a later time, as motor vehicle 102 gets closer to first intersection 302, vehicle safety system 100 may update the threat of collision and could issue an alert.

Referring to FIG. 4, in another situation a driver of motor vehicle 102 may intend to turn left at second intersection 304. In this case, the intention of the driver to turn left is indicated by turning status indicator 330. At this point, motor vehicle 102 may be traveling at approximately 40 mph, as indicated by speedometer 332. In contrast to the situation illustrated in FIG. 3, a driver may apply heavy braking to brake pedal 334 when approaching second intersection 304, since the driver is relatively close to second intersection 304.

As discussed in the embodiment illustrated in FIG. 3, vehicle safety system 100 may determine a stopping distance using one or more vehicle parameters, such as the vehicle speed and braking information. In this case, vehicle safety system 100 estimates a stopping distance D2 for motor vehicle 102 according to the vehicle speed and current braking level. As seen by comparing FIGS. 3 and 4, stopping distance D2 is much shorter than stopping distance D1, due to the heavier braking applied in the current situation. In particular, while motor vehicle 102 is traveling at approximately 40 mph in both situations, the different braking levels result in different decelerations for motor vehicle 102, which will change the estimated stopping distances.

In this situation, vehicle safety system 100 determines a stopping location for motor vehicle 102 that is located distance D2 ahead of motor vehicle 102 at the moment of initial braking. In this case, the stopping location is determined to be the location for an intersection, which corresponds to the location of second intersection 304. Furthermore, once the locations of first remote vehicle 320 and second remote vehicle 322 are determined, vehicle safety system 100 can calculate the potential threat posed by either remote vehicle. In this case, vehicle safety system 100 determines that there is an immediate threat posed by second remote vehicle 322 which is about to pass through second intersection 304. Therefore, vehicle safety system 100 displays a warning alert on display device 336 to alert the driver of a potential collision.

Figure 5:
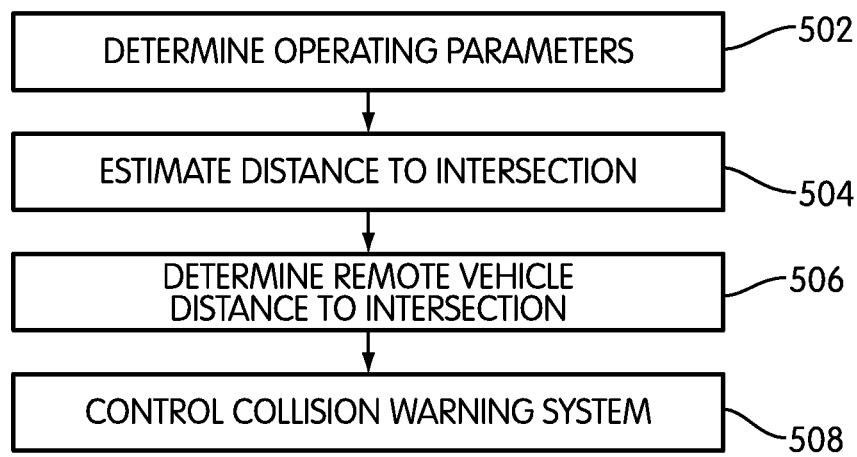
FIG. 5 is an embodiment of a process of operating a vehicle safety system.

FIG. 5 illustrates an embodiment of method for controlling a vehicle safety system, such as a collision warning system. In this embodiment, the following steps may be performed by ECU 120; however in some embodiments these steps may be performed by additional systems or devices associated with motor vehicle 102. In addition, it will be understood that in other embodiments one or more of the following steps may be optional.

For purposes of distinguishing between different vehicles, the terms "host vehicle" and "remote vehicle" are used throughout this detailed description and in the claims. The term "host vehicle" refers to a vehicle with a vehicle safety system. In contrast, a "remote vehicle" is any other vehicle about which the host vehicle may receive information. In some cases, the host vehicle may communicate with the remote vehicle using a vehicle communication network. In other cases, the host vehicle can receive information from the remote vehicle using other methods. For example, the host vehicle can receive a relative location for a remote vehicle using a remote detection device. A remote vehicle may or may not have a vehicle safety system. In the examples given above, motor vehicle 102 is a host vehicle that is capable of communicating with, or receiving information about, one or more remote vehicles. It will be understood that the term "host vehicle" is a relative term, and that other vehicles may have vehicle safety systems and may be considered a host vehicle in different contexts.

During step 502, ECU 120 may determine a set of operating parameters for a host vehicle. For example, in some cases, ECU 120 may determine a turning status, vehicle speed and a braking level. In other cases, ECU 120 may determine acceleration information related to the host vehicle. In still other cases, ECU 120 may determine a turning status, vehicle speed, braking level and acceleration information for the host vehicle. In still other cases, ECU 120 may determine any other operating parameters for the host vehicle that are associated with the operation of any systems or components of the host vehicle.

Next, during step 504, ECU 120 may estimate the distance to an intersection where a driver intends to turn. In some cases, the distance to the intersection can be determined by estimating the stopping distance of the host vehicle, once the driver has indicated an intention to turn left and has started to apply braking. In addition, in some cases, the absolute location of the intersection can be determined from the stopping distance and a known current location for the host vehicle. As previously discussed, in some cases, the current location of the host vehicle can be determined using GPS. In cases where an absolute location for the host vehicle is not known, the location of the intersection relative to the host vehicle can be determined using the stopping distance.

Following step 504, during step 506, ECU 120 may determine a remote vehicle distance to the intersection. In other words, ECU 120 may determine how far the remote vehicle is from the intersection. In some cases, the remote vehicle distance to the intersection can be determined using relative distances between the host vehicle and the intersection and between the host vehicle and the remote vehicle. In other cases, the remote vehicle distance to the intersection can be determined using absolute location from GPS for the remote vehicle, as well as from an absolute position of the intersection determined during a previous step.

Following step 506, during step 508, ECU 120 may control a vehicle safety system according to the host vehicle distance to the intersection and the remote vehicle distance to the intersection. Generally, ECU 120 may use these distances to determine a potential threat of collision between the host vehicle and the remote vehicle. Once a threat level is determined, ECU 120 can issue an alert according to the type of threat. For example, if the host vehicle distance to the intersection and the remote vehicle distance to the intersection are sufficiently large, ECU 120 may determine that both vehicles are too far for any potential collision and may not issue any alert. However, if the host vehicle distance to the intersection and the remote vehicle distance to the intersection are sufficiently small, ECU 120 may determine that both vehicles are near the intersection and therefore the threat of collision is high. In this case, ECU 120 may issue a warning threat to warn a driver of a potential collision.

Figure 6:
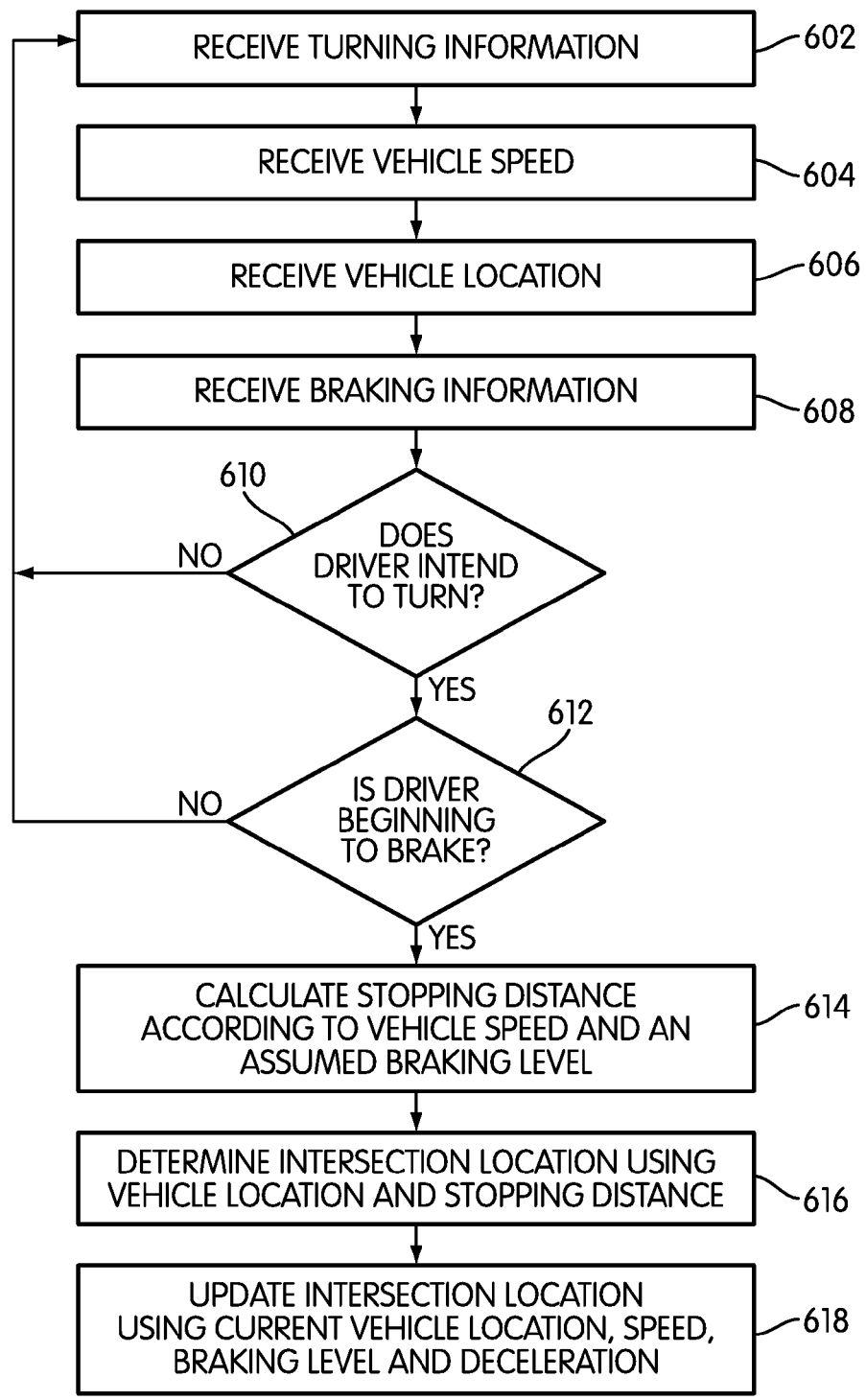
FIG. 6 is an embodiment of a process of operating a vehicle safety system.

FIG. 6 illustrates an embodiment of a detailed process for estimating a host vehicle distance to an intersection. In this embodiment, the following steps may be performed by ECU 120; however in some embodiments these steps may be performed by additional systems or devices associated with motor vehicle 102. In addition, it will be understood that in other embodiments one or more of the following steps may be optional.

During step 602, ECU 120 may receive turning information related to the host vehicle. In some cases, the turning information can be related to the state of a turning status indicator. For example, if a driver switches a turning status indicator to a left turning state, this information can be sent to ECU 120. In other cases, the turning information can be determined using GPS location and turning lane information from a GPS based map. If, for example, ECU 120 determines that the host vehicle is in a left turn only lane, ECU 120 may then determine that the host vehicle intends to turn left.

Next, during step 604, ECU 120 can receive information related to a vehicle speed of the host vehicle. In some cases, the vehicle speed can be measured directly using a vehicle speed sensor. In other cases, the vehicle speed can be calculated using GPS based location information. In still other cases, the vehicle speed can be determined using any other method known in the art.

Next, during step 606, the host vehicle may receive a vehicle location. In some cases, the vehicle location can be determined using GPS information. In other cases, the vehicle location can be determined in other manners. It will be understood that step 606 may be an optional step in some embodiments. In particular, in situations where only the relative distances between the host vehicle, the remote vehicle, and the intersection are desired, the absolute location of the host vehicle or the remote vehicle may not be required.

Following step 606, ECU 120 may proceed to step 608. During step 608, ECU 120 may receive braking information for the host vehicle. In some cases, the braking information can comprise information that a brake pedal has been depressed. In other cases, the braking information can further include a braking level. The term "braking level" refers to any measure of the amount of braking that can occur. For example, in one situation, the braking information could be associated with a continuous or discrete value that indicates the degree of braking in a range between no braking and maximum braking. In different embodiments, the braking level could be associated with the position of a brake pedal. In other embodiments, the braking level could be associated with any other measurable characteristics of a brake system.

Following step 608, ECU 120 may proceed to step 610. During step 610, ECU 120 may determine if the driver intends to turn. In particular, ECU 120 may determine if the driver intends to turn using the turning information received during step 602. If the driver intends to turn, which may be indicated by a turning status indicator in a left turn position, for example, ECU 120 may proceed to step 612. Otherwise, ECU 120 may return back to step 602 to receive further information.

During step 612, ECU 120 may determine if the driver is beginning to brake. In particular, ECU 120 may determine if the driver is beginning to brake using the braking information received during step 608. If the driver intends to brake, ECU 120 may proceed to step 614. Otherwise, if the driver does not intend to brake, ECU 120 may proceed to step 602 to receive further information about the operating parameters of the host vehicle.

During step 614, ECU 120 may calculate a stopping distance for the host vehicle using the vehicle speed and an assumed braking level. In some cases, ECU 120 may calculate the stopping distance by dividing the vehicle speed by the assumed braking level. In other cases, ECU 120 may calculate the stopping distance in another manner. The assumed braking level can be determined in any manner. In some cases, the assumed braking level can be a pre-stored value that is set during manufacturing. In other cases, the assumed braking level can be a learned value that is updated over time as the driver depresses the brake pedal to stop at intersections. In still other cases, the assumed braking level can be a function of various operating parameters such as vehicle speed, engine speed, gear or other operating parameter. In still other cases, the assumed braking level can be a function of roadway conditions. For example, the assumed braking level could vary between wet roadway conditions and dry roadway conditions. Although the current embodiment uses an assumed braking level to determine an initial value for the stopping distance, in other embodiments, the initial calculation can include a current braking level, rather than an assumed braking level.

Next, during step 616, ECU 120 may determine a location for the intersection using the vehicle location and the stopping distance. In cases where an absolute location, such as a GPS location, for the host vehicle is known, the location for the intersection can be determined as an absolute location. In other cases, where an absolute position of the host vehicle is not known, the location of the intersection can be a relative location.

In some embodiments, once a location for the intersection has been calculated, ECU 120 may continue to update the stopping distance, which is the distance to the intersection, and the intersection location, using current vehicle operating parameters. In some cases, following step 616, ECU 120 may proceed to step 618. During step 618, ECU 120 may update the intersection location using the current vehicle location, the current vehicle speed, the current braking level and the deceleration of the vehicle. Specifically, the stopping distance may be recalculated using these current values and the location of the intersection can be adjusted according to the new stopping distance. In some cases, the deceleration can be calculated from the vehicle speed. In other cases, the deceleration can be determined in another manner. Furthermore, it will be understood that in other embodiments, only some of these parameters may be used in calculating an updated location for the intersection. For example, in another embodiment, during step 618, only the current braking level may be used to update the intersection location. With this arrangement, the location of the intersection can be more accurately calculated by using current values of the parameters as the host vehicle continues to approach the intersection.

Figure 7:
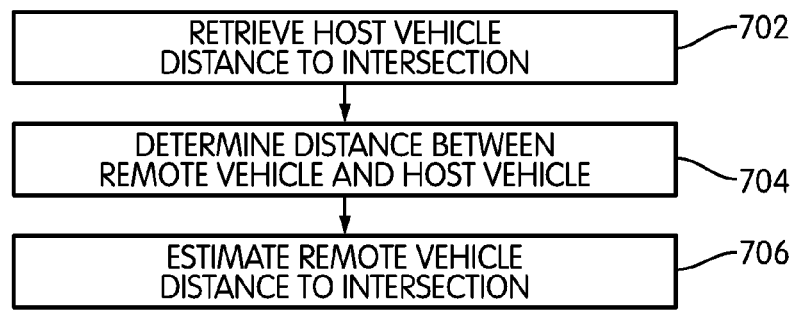
FIG. 7 is an embodiment of a process of operating a vehicle safety system.

FIG. 7 illustrates an embodiment of a process for determining a remote vehicle distance to an intersection. In this embodiment, the following steps may be performed by ECU 120; however in some embodiments these steps may be performed by additional systems or devices associated with motor vehicle 102. In addition, it will be understood that in other embodiments one or more of the following steps may be optional.

During step 702, ECU 120 may retrieve the host vehicle distance to intersection. Next, during step 704, ECU 120 may determine the distance between the remote vehicle and the host vehicle. In some cases, this can be accomplished using GPS information. For example, the host vehicle determines a host vehicle location according to received GPS information. In addition, the host vehicle may receive the GPS location of the remote vehicle directly from the remote vehicle using a vehicle communication network. In other cases, however, the distance between the two vehicles can be determined using a remote detection device, such as a RADAR or LIDAR, as previously discussed. In still other cases, the distance between the host vehicle and the remote vehicle can be determined in another manner. Following step 704, during step 706, ECU 120 may estimate the remove vehicle distance to the intersection. In some cases, this can be determined by subtracting the host vehicle distance to the intersection from the distance between the host vehicle and the remote vehicle.

Figure 8:
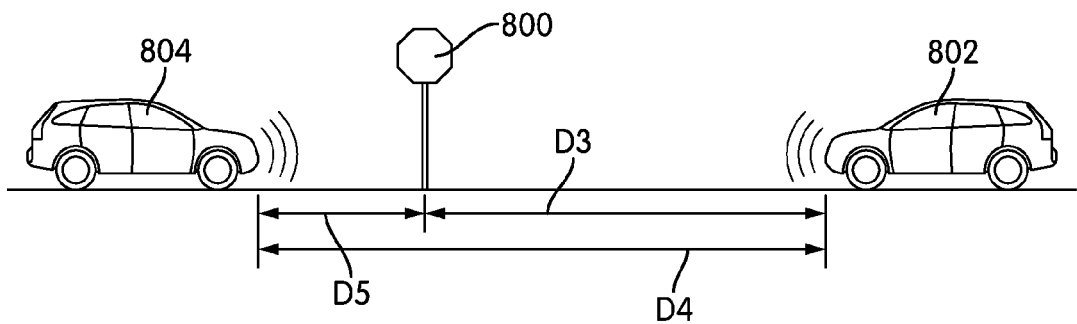
FIG. 8 is a schematic view of an embodiment of a method of determining the distance of a remote vehicle to an intersection.

FIG. 8 illustrates an exemplary embodiment of a method of calculating a remote vehicle distance to the intersection. Referring to FIG. 8, host vehicle 802 is driving towards intersection 800. Likewise, remote vehicle 804 is driving towards intersection 800 from an opposing direction. In this case, host vehicle 802 and remote vehicle 804 are in opposing traffic lanes of a single roadway.

As previously discussed, host vehicle 802 may estimate stopping distance D3, which is the distance between the host vehicle and the intersection, according to various vehicle operating parameters including vehicle speed and braking level. Furthermore, host vehicle 802 may determine distance D4 between the host vehicle and remote vehicle using GPS information and a vehicle communication network, or a remote detection device. From the values of distance D3 and distance D4, host vehicle 802 can determine distance D5, which is the distance between remote vehicle 804 and intersection 800. In particular, distance D5 is approximately equal to distance D4 minus distance D3.

In some embodiments, to increase the accuracy of the calculated distance between the remote vehicle and the intersection, the calculation can be tailored to estimate either the intersection stop bar or the actual intersection cross lane edge depending on the type of information required by the vehicle safety systems. In some cases, this can be accomplished using average intersection topologies. In other words, average intersection sizes can be used to adjust the estimated distances to reflect the finite size of the intersection.

Figure 9:
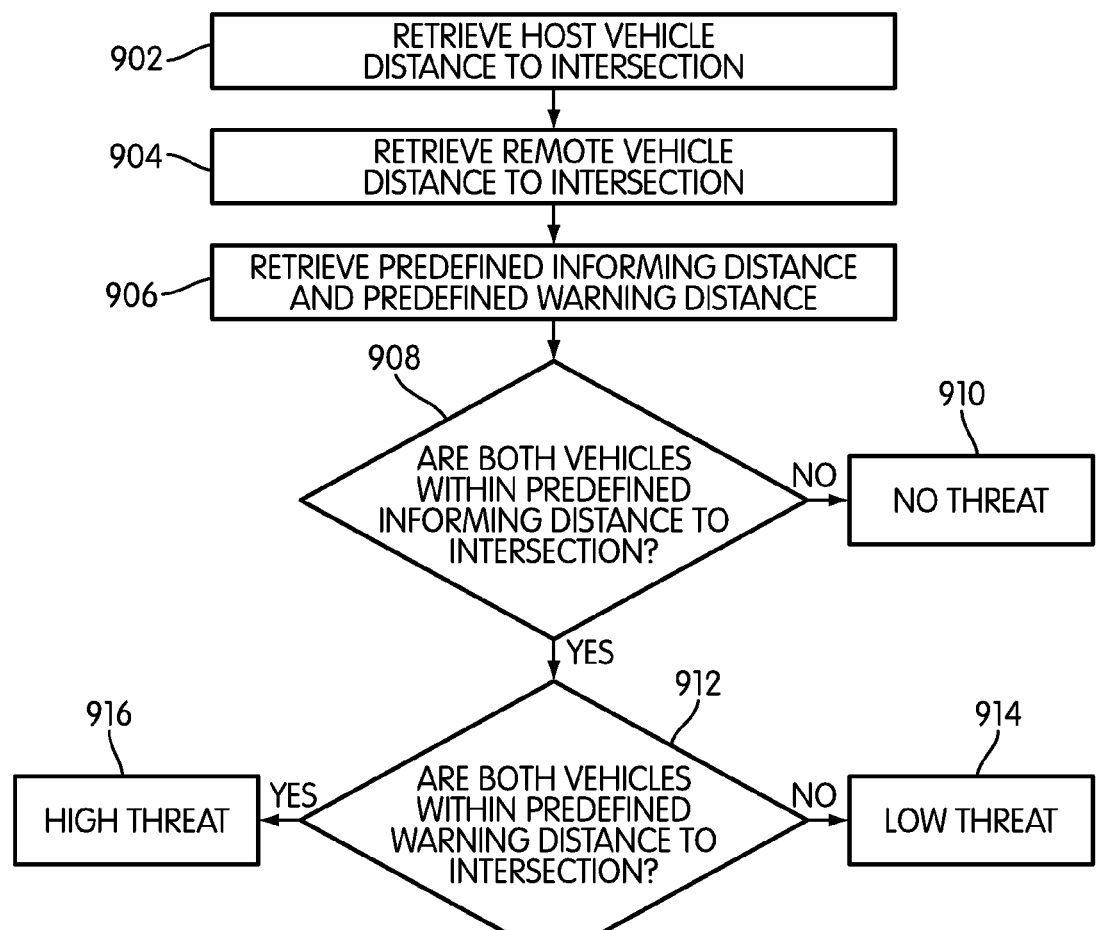
FIG. 9 is an embodiment of a process for calculating a threat level for a vehicle safety system.

FIG. 9 illustrates an embodiment of a detailed process for calculating a threat level. In this embodiment, the following steps may be performed by ECU 120; however in some embodiments these steps may be performed by additional systems or devices associated with motor vehicle 102. In addition, it will be understood that in other embodiments one or more of the following steps may be optional.

During step 902, ECU 120 may retrieve the host vehicle distance to intersection. Next, during step 904, ECU 120 may retrieve the remote vehicle distance to intersection. At this point, ECU 120 may proceed to step 906. During step 906, ECU 120 retrieves a predefined informing distance and a predefined warning distance. In other words, the predefined informing distance is a distance from the intersection within which the collision warning system may determine that there is a low threat of collision. Likewise, the predefined warning distance is a distance from the intersection within which the collision warning system may determine that there is a high threat of collision.

Following step 906, ECU 120 may proceed to step 908. During step 908, ECU 120 may determine if the host vehicle and the remote vehicle are both within the predefined informing distance from the intersection. If ECU 120 determines that both the host vehicle and the remote vehicle are not within the predefined informing distance from the intersection, then ECU 120 may proceed to step 910, where ECU 120 determines that there is no threat. Otherwise, ECU 120 proceeds to step 912.

During step 912, ECU 120 determines if the host vehicle and the remote vehicle are both within the predefined warning distance of the intersection. If ECU 120 determines that the host vehicle and the remote vehicle are not within the predefined warning distance of the intersection, ECU 120 may proceed to step 914. During step 914, ECU 120 determines that there is a low threat level. If, during step 912, ECU 120 determines that the host vehicle and the remote vehicle are within the predefined warning distance to the intersection, ECU 120 proceeds to step 916. During step 916, ECU 120 determines that there is a high threat level.

It will be understood that the current embodiment of a process for determining a threat of collision is only intended to be exemplary. Generally, any method of determining a threat level according to information related to a host vehicle and a remote vehicle may be used. In other embodiments, a vehicle safety system can use another process for determining a threat of collision. For example, in another embodiment, rather than calculating a distance of the host vehicle to the intersection and a distance of the remote vehicle to the intersection, the host vehicle time to the intersection and the remote vehicle time to the intersection can be calculated and used to determine the threat. In particular, once the host vehicle distance to the intersection is known, the host vehicle time to the intersection can be determined using the host vehicle speed, location and/or deceleration. Likewise, once the remote vehicle distance to the intersection is known, the remote vehicle time to the intersection can be determined using the remote vehicle speed, location and/or deceleration. In some cases, the remote vehicle speed, location and/or deceleration can be received from a vehicle communication network. In other cases, the remote vehicle speed, location and/or acceleration can be measured directly using a remote detection device.

A vehicle safety system can include provisions for improving the accuracy of a vehicle to intersection distance. For example, in some embodiments, a vehicle safety system could utilize an adaptive algorithm that builds a driver-intersection profile. The term "driver-intersection profile" as used throughout this detailed description and in the claims, refers to a collection of information that characterizes the behavior of a particular driver near an intersection. For example, in some cases, a driver-intersection profile for a driver may include information related to the typical distance at which the driver tends to start braking prior to turning left at an intersection. In other cases, a driver-intersection profile for a driver may include information related to a typical braking level applied by a driver during stopping and/or turning.

In different embodiments, a driver-intersection profile can be determined in any manner. In some cases, the driver-intersection profile could be determined by tracking stopping and/or turning maneuvers that can be tracked using GPS mapping or dead reckoning calculations. This information could be stored and used to build a driver-intersection profile over time. This arrangement allows for the system to develop estimations that more closely model the driver/vehicle behavior during stopping and/or turning maneuvers.

Figure 10:
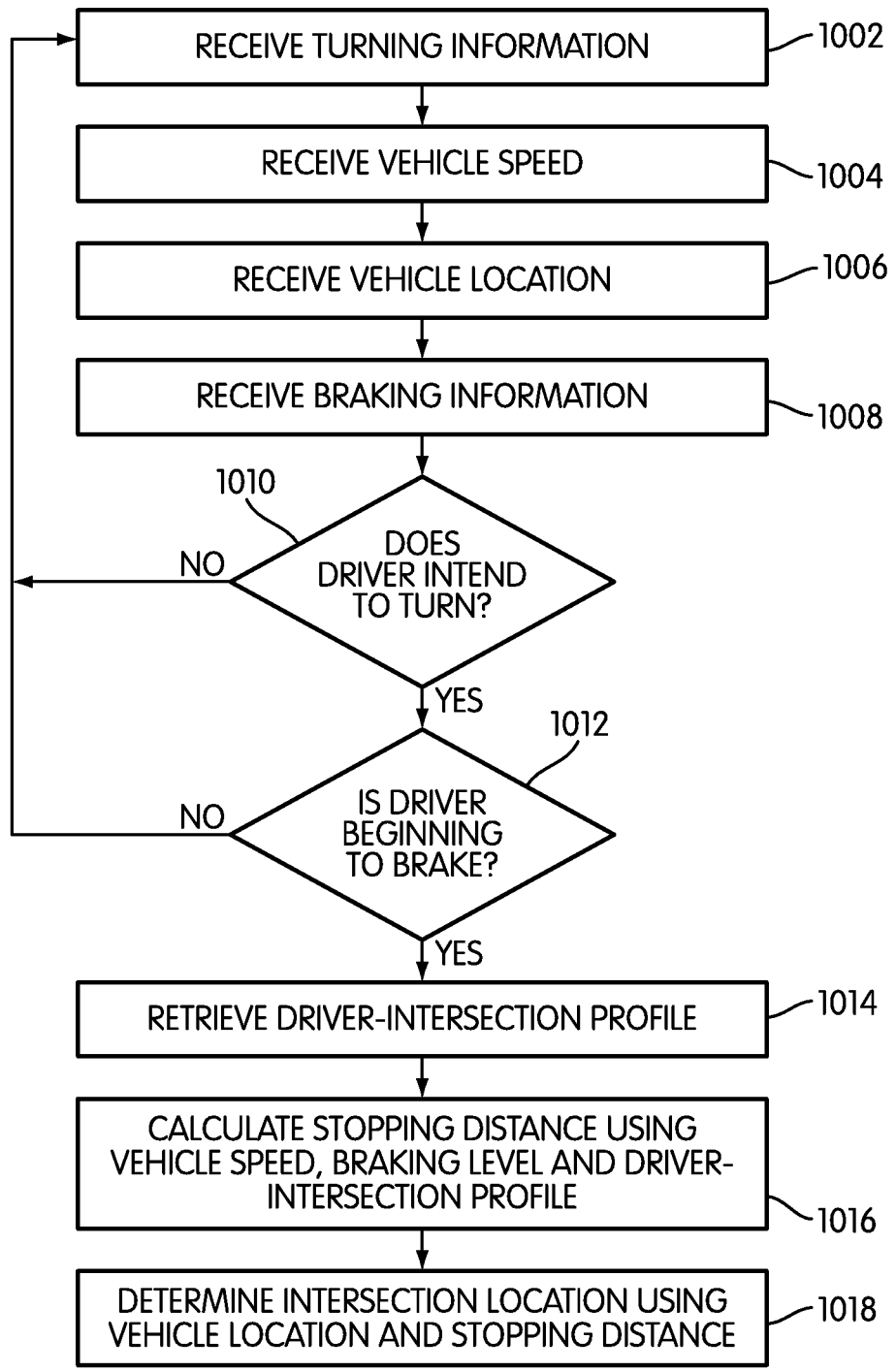
FIG. 10 is an embodiment of a process for operating a vehicle safety system.

FIG. 10 illustrates an embodiment of a method for controlling a vehicle safety system. In this embodiment, the following steps may be performed by ECU 120; however in some embodiments these steps may be performed by additional systems or devices associated with motor vehicle 102. In addition, it will be understood that in other embodiments one or more of the following steps may be optional.

During step 1002, ECU 120 may receive turning information related to the host vehicle. In some cases, the turning information can be related to the state of a turning status indicator. For example, if a driver switches a turning status indicator to a left turning state, this information can be sent to ECU 120. In other cases, the turning information can be determined using GPS location and turning lane information from a GPS based map. If, for example, ECU 120 determines that the host vehicle is in a left turn only lane, ECU 120 may then determine that the host vehicle intends to turn left.

Next, during step 1004, ECU 120 can receive information related to a vehicle speed of the host vehicle. In some cases, the vehicle speed can be measured directly using a vehicle speed sensor. In other cases, the vehicle speed can be calculated using GPS based location information. In still other cases, the vehicle speed can be determined using any other method known in the art.

Next, during step 1006, the host vehicle may receive a vehicle location. In some cases, the vehicle location can be determined using GPS information. In other cases, the vehicle location can be determined in other manners. It will be understood that step 1006 may be an optional step in some embodiments. In particular, in situations where only the relative distances between the host vehicle, the remote vehicle, and the intersection are desired, the absolute location of the host vehicle or the remote vehicle may not be required.

Following step 1006, ECU 120 may proceed to step 1008. During step 1008, ECU 120 may receive braking information for the host vehicle. In some cases, the braking information can comprise information that a brake pedal has been depressed. In other cases, the braking information can further include a braking level.

Following step 1008, ECU 120 may proceed to step 1010. During step 1010, ECU 120 may determine if the driver intends to turn. In particular, ECU 120 may determine if the driver intends to turn using the turning information received during step 1002. If the driver intends to turn, which may be indicated by a turning status indicator in a left turn position, for example, ECU 120 may proceed to step 1012. Otherwise, ECU 120 may return back to step 1002 to receive further information.

During step 1012, ECU 120 may determine if the driver is beginning to brake. In particular, ECU 120 may determine if the driver is beginning to brake using the braking information received during step 1008. If the driver intends to brake, ECU 120 may proceed to step 1014. Otherwise, if the driver does not intend to brake, ECU 120 may proceed to step 1002 to receive further information about the operating parameters of the host vehicle.

During step 1014, ECU 120 may retrieve a driver-intersection profile. In some cases, the driver-intersection profile can be selected according to various operating conditions or other parameters. For example, the driver-intersection profile can vary as a function of weather conditions. In other cases, the driver-intersection profile can be retrieved from another component of the motor vehicle. Next, during step 1016, ECU 120 may calculate a stopping distance using the vehicle speed, braking level and driver-intersection profile. In other cases, however, during step 1016, ECU 120 may calculate a stopping distance using additional information as well, including the deceleration of the vehicle as well as any other operating parameters. Following step 1016, during step 1018, ECU 120 may determine an intersection location using the vehicle location and the stopping distance calculated during the previous step.

It will be understood that while the current embodiments discuss a method of estimating a location of an intersection for purposes of controlling a vehicle safety system, in other embodiments the estimating of an intersection location could be applied to other systems of a motor vehicle. For example, other types of collision control systems that activate safety features in a vehicle could utilize the method of locating an intersection as discussed above. Furthermore, the methods could be applied to any other systems of a motor vehicle that require information about an intersection where a driver may intend to turn.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating a motor vehicle, comprising the steps of:
   receiving a vehicle speed, a vehicle location and braking information;
   estimating a first distance between the motor vehicle and an intersection using the vehicle speed and the braking information;
   determining a second distance between the motor vehicle and a remote vehicle;
   estimating a third distance between the remote vehicle and the intersection using the first distance and the second distance;
   controlling a vehicle safety system of the motor vehicle according to the first distance and the third distance; and
   wherein the vehicle safety system is a collision warning system and wherein the step of estimating the third distance is followed by a step of determining a threat level according to the first distance and the third distance and wherein the collision warning system is controlled according to the threat level.

2. The method according to claim 1, wherein the second distance is determined using a vehicle communication network.

3. The method according to claim 1, wherein the second distance is measured using a remote detection device.

4. The method according to claim 1, wherein the step of determining the threat level according to the first distance and the third distance further comprises retrieving at least one predefined distance and comparing the first distance and the third distance to the at least one predefined distance to determine the threat level.

5. A method of operating a motor vehicle, comprising the steps of:
- receiving a vehicle speed, a vehicle location and braking information;
- estimating a first distance between the motor vehicle and an intersection using the vehicle speed and the braking information;
- determining a second distance between the motor vehicle and a remote vehicle;
- estimating a third distance between the remote vehicle and the intersection using the first distance and the second distance;
- controlling a vehicle safety system of the motor vehicle according to the first distance and the third distance; and
- wherein the vehicle safety system is a collision warning system and wherein the step of estimating the third distance is followed by a step of calculating a first time for the motor vehicle to arrive at the intersection and a second time for the remote vehicle to arrive at the intersection.

6. The method according to claim 5, wherein a threat level is calculated using the first time and the second time and wherein the collision warning system is controlled according to the threat level.

* * * * *